United States Patent
Dauvergne

(12) 
(10) Patent No.: US 6,227,611 B1
(45) Date of Patent: *May 8, 2001

(54) INSTRUMENT PANEL FOR A VEHICLE

(75) Inventor: Jean Dauvergne, Gondecourt (FR)

(73) Assignee: Plastic Omnium Auto Interierur, Carteret Lyon (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,494

(22) Filed: Dec. 10, 1997

(30) Foreign Application Priority Data

Dec. 10, 1996 (FR) .................................................. 96 15393

(51) Int. Cl.[7] .............................. B60H 1/34; B60K 37/00; B60S 1/54; B62D 25/14

(52) U.S. Cl. .............................. 296/208; 180/90; 454/121

(58) Field of Search ....................... 296/70, 208; 180/90; 280/752; 454/121, 127, 124, 141, 142, 140, 156

(56) References Cited

U.S. PATENT DOCUMENTS

| | | | | |
|---|---|---|---|---|
| 4,223,754 | * | 9/1980 | Mizuno et al. | 180/90 |
| 4,852,638 | * | 8/1989 | Hildebrand et al. | 165/42 |
| 5,062,352 | * | 11/1991 | Ostrand | 98/2.08 |
| 5,186,237 | * | 2/1993 | Adasek et al. | 165/42 |
| 5,556,153 | * | 9/1996 | Kelman et al. | 296/70 |
| 5,564,515 | * | 10/1996 | Schambre | 180/90 |
| 5,699,851 | * | 12/1997 | Saida et al. | 165/42 |
| 5,709,601 | * | 1/1998 | Heck | 454/121 |
| 5,762,395 | * | 6/1998 | Merrifield et al. | 296/203 |

FOREIGN PATENT DOCUMENTS

0456531 * 11/1991 (EP) ........................................ 296/70

* cited by examiner

*Primary Examiner*—D. Glenn Dayoan
*Assistant Examiner*—Paul Chenevert
(74) *Attorney, Agent, or Firm*—Harrison & Egbert

(57) ABSTRACT

An instrument panel for a vehicle, in particular an automobile, which allows circulation of an air flow for the ventilation, heating and/or air conditioning of the vehicle. The instrument panel has at least one three-dimensional component positioned generally in a direction transverse to the longitudinal axis of the vehicle. The mechanisms for ventilation, heating and air conditioning are distributed in the same plane parallel to such transverse direction. The three-dimensional component is positioned so as to increase resistance of the vehicle to a lateral shocks.

9 Claims, 4 Drawing Sheets

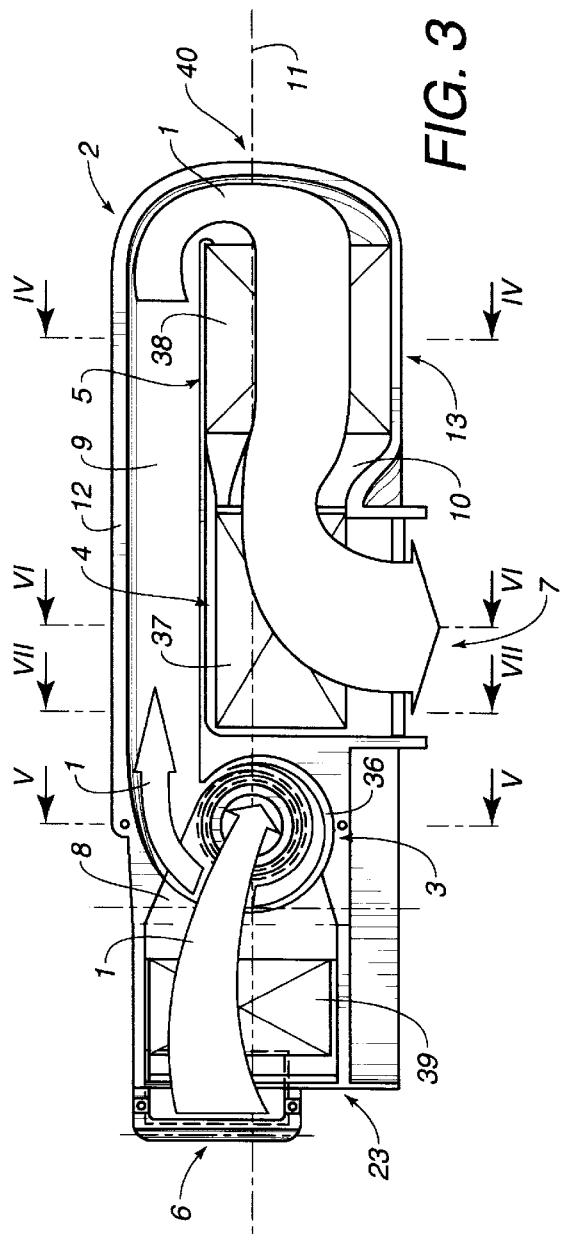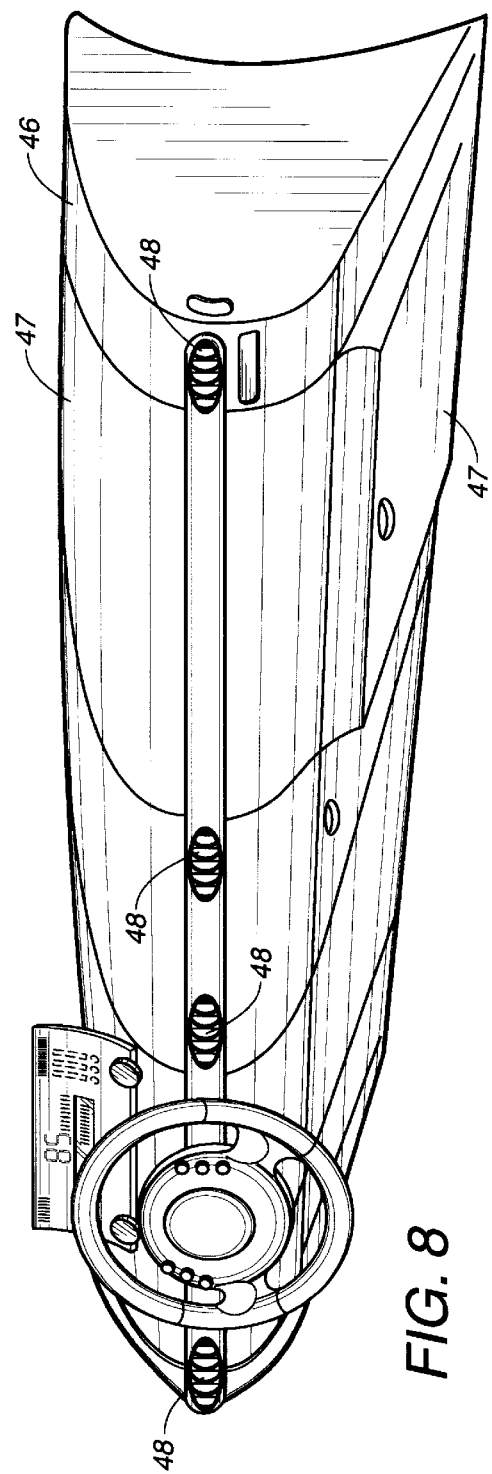

INSTRUMENT PANEL FOR A VEHICLE

TECHNICAL FIELD

The invention presented here involves an instrument panel for a vehicle, in particular for an automobile.

However, although developed most particularly for applications of that sort, it may also be used in numerous other nautical, air and/or terrestrial vehicles.

In a general way, moreover, it will be possible to implement it as internal fittings which combine different accessories and/or equipment, in all the areas of economic activity in which one encounters control stations, switchboards, and/or other stations in fixed or mobile installations.

BACKGROUND ART

Currently, in the sector of automotive vehicles, known instrument panels are generally made of a covering panel which makes it possible to conceal the components of the internal equipment and/or the accessories customarily found at this level such as, for example, components of an air conditioning circuit as well as the connection conduits.

The equipment and/or accessory components are more often than not fastened using casinos to the body of the vehicle or to a transverse bar which reinforces against lateral stresses and is also concealed by the covering panel.

The first disadvantage of these instrument panels is that they have a large number of different components. The characteristics and/or the positions of the different components must be redefined for every version modification as a function of, for example, the vehicle class manufactured and/or the position of its steering column.

Moreover, the components cause an increase in cluttering to the detriment of the space available for the storage, as well as an increase in weight which alters the performance of the equipped vehicle. It can also be noted that they require a long and costly installation sometimes involving the performance of blind operations.

Another disadvantage of the instrument panels currently known is that the technical restrictions imposed on the covering panel limit the possibilities for variations in its aesthetic appearance.

The purpose of the invention presented here is to propose an instrument panel which compensates for the aforementioned disadvantages and makes it possible to perform combinations of components so that its manufacture can be made efficient.

Another purpose of the invention presented here is to propose an instrument panel for a vehicle which has a maximum number of common components, where they are placed in fixed positions for all versions of vehicles for which the instrument panel is designed, and particularly in such a manner to be independent of the right or left positioning of the steering column.

Another purpose of the invention presented here is to propose an instrument panel having less weight and increased available space for storage.

Another purpose of the invention presented here is to propose an instrument panel allowing a large freedom of choice for aesthetic presentation of the covering.

Another purpose of the invention presented here is to propose an instrument panel whose manufacture and/or installation is made easier.

Another purpose of the invention presented here is to propose an instrument panel for vehicles such that its heaviest components are located close to the vehicle running board so as to increase their stability.

Other purposes and advantages of the invention presented here appear in the course of the following description which is only a guideline and is not intended to limit the invention.

SUMMARY OF THE INVENTION

The invention presented here involves an instrument panel for vehicles, in particular for automobiles, fitted to allow at least the circulation of an air flow for ventilation, heating and/or air conditioning of the vehicle, having at least one three-dimensional component suitable for being positioned roughly in a direction transverse to the vehicle, such that it increases resistance of the vehicle to lateral shocks and allows the circulation of the air flow among at least the mechanisms of ventilation, heating, and/or air conditioning, an air intake and an air outlet, with the mechanisms of ventilation, heating, and/or air conditioning being roughly distributed in the same plane parallel to the aforementioned transverse direction.

BRIEF DESCRIPTION OF THE INVENTION

The invention presented here is better understood in reading the following description, accompanied by the attached drawings which make up an integral part of it, and among which:

FIG. 1 shows, in perspective in an exploded view, an example of the instrument panel according to the invention, FIG. 2 shows, in perspective in an exploded view, an embodiment example of the components of the instrument panel depicted in FIG. 1, FIG. 3 is a view from below the component depicted in the aforementioned FIG. 2, FIG. 4 is a sectional view according to the line IV—IV depicted in the aforementioned FIG. 3, FIG. 5 is a sectional view according to the line V—V depicted in the aforementioned FIG. 3, FIG. 6 is a sectional view according to the line VI—VI depicted in the aforementioned FIG. 3, FIG. 7 is a sectional view according to the line VII—VII depicted in the aforementioned FIG. 3, FIG. 8 depicts an example of the external appearance which can be given an instrument panel according to the invention.

BRIEF DESCRIPTION OF THE DRAWINGS

The invention presented here involves an instrument panel for vehicles, as in particular for automobiles.

However, although developed most particularly for applications of that sort, it may also be used in numerous other nautical, air and/or terrestrial vehicles. In a general way, moreover, it will be possible to implement it as internal fittings which combine different accessories and/or equipment, in all the areas of economic activity in which one encounters control stations, switchboards, and/or other stations in fixed or mobile installations.

Figure 1:
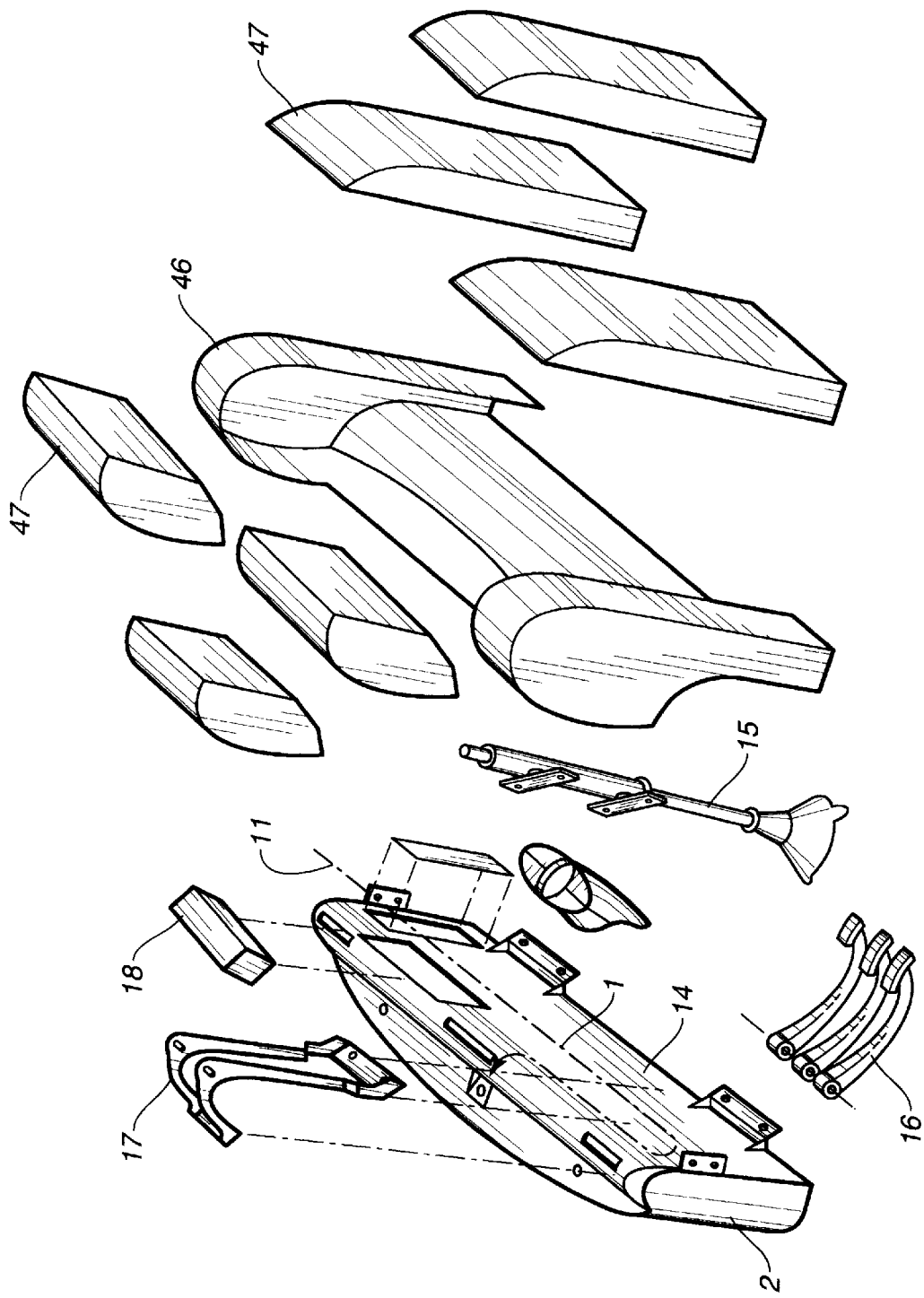

As depicted in FIG. 1, the instrument panel according to the invention is fitted to allow at least circulation of the air flow 1 for ventilation, heating and/or air conditioning of the vehicle.

According to the invention, it has at least one three-dimensional component 2 suitable at least for being positioned roughly in a direction transverse to the vehicle, such that it increases resistance of the vehicle to lateral shocks.

Figure 2:
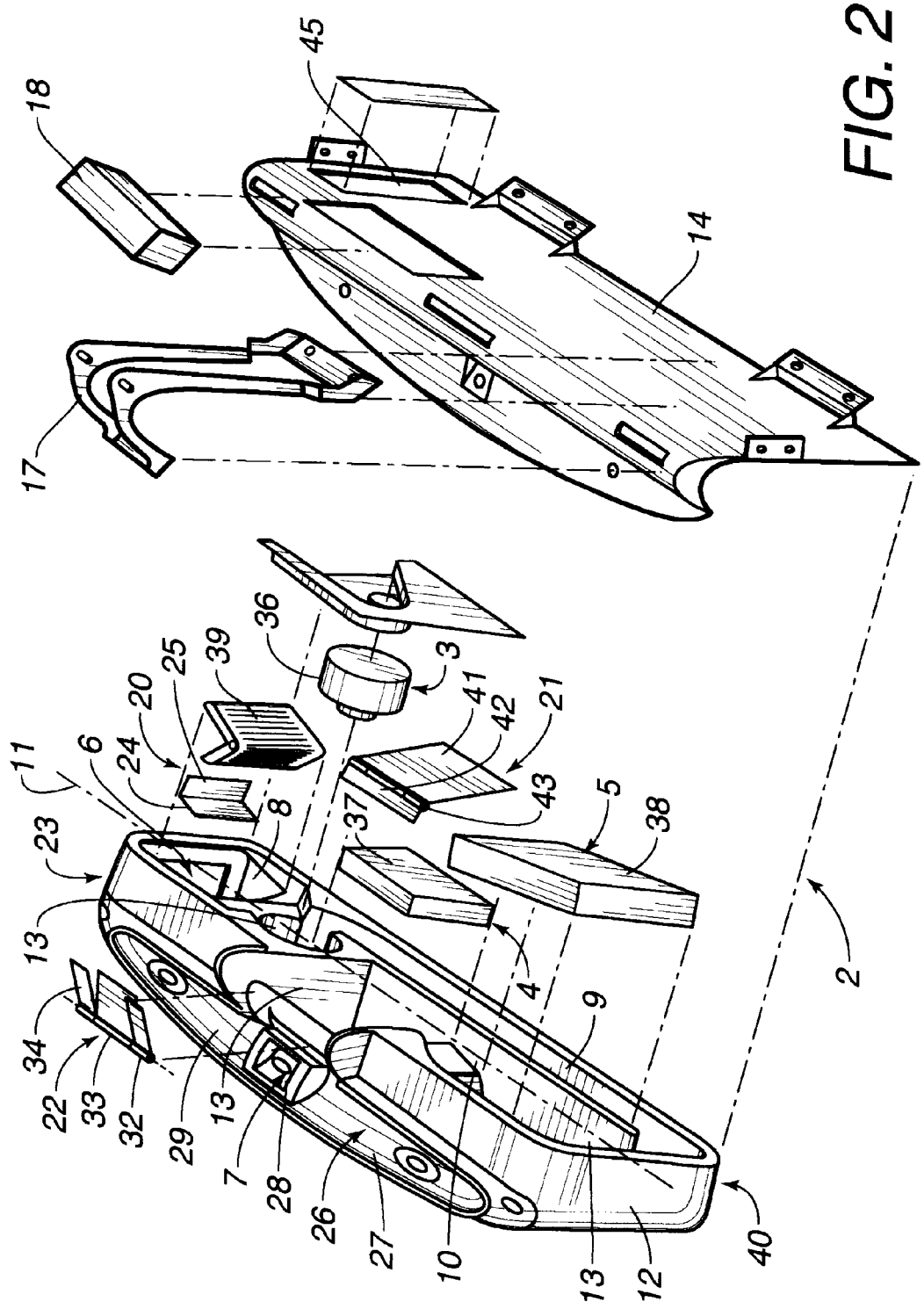

As shown in FIG. 2, the three-dimensional component 2 is also suited to at least allow the circulation of the air flow 1 among the mechanisms for ventilation 3, heating 4 and/or air conditioning 5, an air intake 6 and an air outlet 7, with the mechanisms of ventilation 3, heating 4, and/or air conditioning 5 being roughly distributed in the same plane parallel to the aforementioned transverse direction.

Using a combination brought about by the three-dimensional component 2, the instrument panels according to the invention require a lower number of components. Moreover, by a positioning in a same plane parallel to the transverse direction of the mechanisms for ventilation 3, heating 4 and/or air conditioning 5, the instrument panels according to the invention have a large space available for storage.

As shown in FIG. 3, the mechanisms for ventilation 3, heating 4 and/or air conditioning 5, are, for example, roughly aligned one after another in the transverse direction, in proximity to the longitudinal axis 11 of the three-dimensional component 2.

If reference is again made to FIG. 2, it is observed that the three-dimensional component 2 has in particular a roughly parallelepiped shape having a minimum thickness in the direction orthogonal to the plane in which the mechanisms for ventilation 3, heating 4 and/or air conditioning 5 are distributed. Moreover, the longitudinal axis 11, oriented roughly in the aforementioned transverse direction, is roughly horizontal. In addition, different openings are arranged specifically on the surface of the three-dimensional component 2 for the air inlet(s) 6 and/or the air outlet(s) 7.

The path of the air flow 1 in the three-dimensional component 2 is, for example, roughly planar. It is expected by this that the circulation of the air flow I is conducted in the plane in which the mechanisms for ventilation 3, heating 4 and/or air conditioning 5 are arranged, and/or in proximity to them in case of a slight deviation of the air flow 1 due to the conditioning experienced such as, for example, acceleration of the air flow at the level of the mechanisms for ventilation 3, the use or non-use of the mechanisms for air conditioning 5 and/or heating 4, and/or other treatments. The plane is called the flow plane in the following.

The air inlet(s) 6 and the air outlet(s) 7, provided upstream from where the flow is distributed in different directions, are located, for example, at the same level as the mechanisms for ventilation 3, heating 4 and/or air conditioning 5, in particular, roughly in the flow plane.

For this, according to the embodiment example depicted, the three-dimensional component 2 is made up of a body 12 equipped with receptacles 13 for the mechanisms for ventilation 3, heating 4 and/or air conditioning 5, of the internal conduits 8, 9, 10 connecting the mechanisms for ventilation 3, heating 4 and/or air conditioning 5, the air inlet(s) 6 and the air outlet(s) 7, and a covering cap 14.

The receptacles 13 and/or the conduits 8, 9, 10 are made, for example, in the bulk of the body 12 and are closed by the covering cap 14.

In order to make the body 12, one can use, particularly, a plastic foam material and/or expanded plastic material such as, for example, polypropylene and/or only globules of expanded and compressed polystyrene.

If reference is again made to FIG. 1, it is observed that the covering cap 14 is fitted to form, in addition and in particular, a support for the equipment and/or accessory components. This could involve, for example, a steering column 15 and/or a pedal assembly 16, attached to the covering cap using an armature 17. It could involve, for example, a device of inflatable padding 18 air bag.

As depicted in the different FIGS. 4 to 7, it is observed that the three-dimensional component 2 is fitted to be adjoined directly or indirectly to the top section of the running board 19 of the vehicle.

Figure 4:
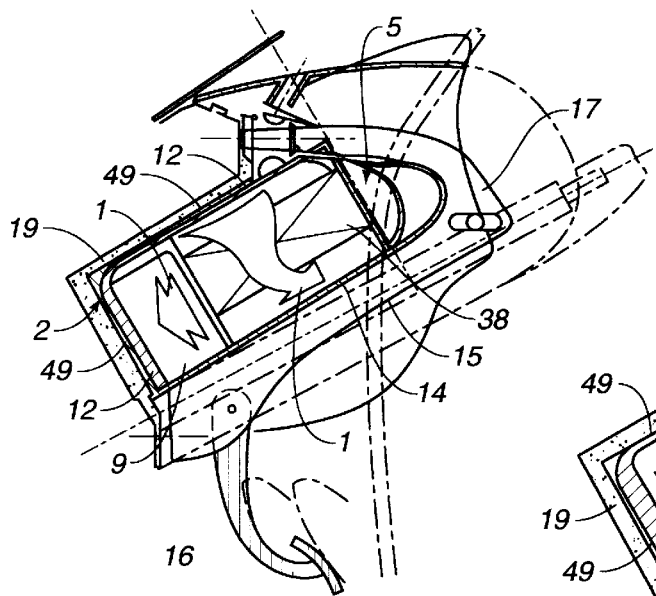

Thus, by its positioning and its roughly planar configuration, the three-dimensional component 2 is above the steering column 15 and its structure thus does not depend on the right or left position of the steering column as especially depicted in FIG. 4.

In a manner so as to allow the orientation of the air flow 1 towards the legs of the driver and/or the passengers of the vehicle, the instrument panel according to the invention defines, for example, an air jet 49 between the running board 19 and the three-dimensional component 2, fitted to form a conduit for the discharge of the air flow 1 towards the floor of the vehicle.

In order to do this, the section of the outline of the three-dimensional component 2 facing the panel - running board - 19 of the vehicle roughly follows the shape of the running board 19, an air-gap being, between the three-dimensional component 2 and the running board 19.

As a note, it is observed that the running board 19 of the vehicle, equipped with the instrument panel according to the invention, is covered, if necessary, by a soundproofing shell.

This being given, as depicted especially in FIG. 2, according to the embodiment depicted, the three-dimensional component 2 has of mechanisms for selecting the path of the air flow 1. These mechanisms are made up of, in particular, mobile flaps 20, 21 arranged among other things, at the level of the air inlet(s) 6, in a mainer so as to adjust the source of the air introduced and/or at the level of the mechanisms of heating 4, so as to adjust the temperature of the air flow.

In regard to the air inlet, the three-dimensional component 2 is equipped in particular with an opening on one of the lateral sides 23. This air inlet 6 has, for example, a mobile flap 20, in two parts 24, 25, connected around the same axle by a variable angular gap in such a way so as to allow the introduction of external air and/or recirculated air into the vehicle. This articulation axle of the mobile flap 20 is affixed to the body 12.

In regard to the air outlet, the three-dimensional component 2 has if necessary an orientation chamber 26 of the air flow 1. The chamber 26 is divided into three outlet conduits 27, 28, 29 each one equipped with an opening specifically at the level of the front side and/or the upper side of the three-dimensional component 2.

According to a first embodiment mode, a mobile flap is planned at the level of each of the air outlets so as to adjust the direction of the air flow 1 emitted.

According to another embodiment mode corresponding to the one depicted, the air flow 1 is able to be split between the outlet conduits 27, 28, 29 using a mobile flap 22 which is made up in particular of three separate plates 32, 33, 34 which can move around a same common articulation axle, the mobile flap 22 being affixed to the body 12, specifically, upstream from the orientation chamber 26 according to the direction of the air flow 1.

The mobile flap 22 thus allows, for example, adjustment of the direction of the air flow 1 emitted. It is positioned in the central section of the three-dimensional component 2.

This being given, the mechanisms of ventilation 3, heating 4, and/or air conditioning 5 are made up, for example, of an air blower 36, a radiator 37, and an evaporator 38, respectively.

The three-dimensional component 2 in addition, to accommodate one or more of the filters 39, in the flow plane. The filters 39 are thus, if necessary, roughly aligned with the blower 36, the radiator 37, and/or the evaporator 38.

Figure 5:
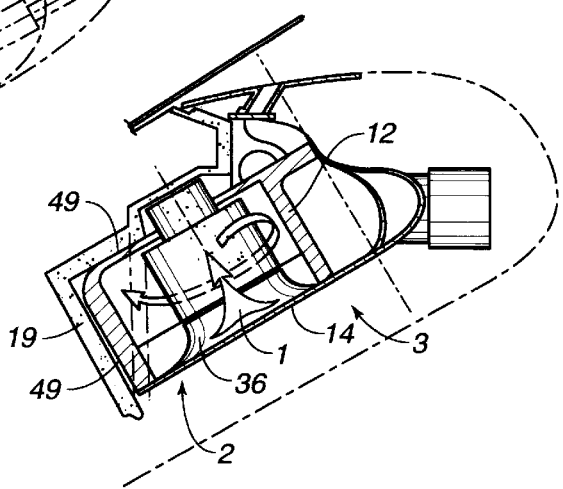

If reference is made again to FIG. 3, it is observed that the air flow 1 follows, for example, the following path. It is first introduced into the three-dimensional component 2 by the air inlet 6 and passes into the first conduit 8 through the filter(s) 39 up to the blower 36. At this level, as depicted in FIG. 5, it is sucked up in an orthogonal direction to the flow plane, in order to be accelerated in the depth of the body 12 before coming out into a second conduit 9.

The air flow 1 runs through the second conduit again oriented according to the flow plane. Having arrived at the side end 40 opposite to the side end 23 having the air inlet 6, it undergoes a half turn and reaches a third conduit 10. It passes across the evaporator 38 in order to come out, as always in the flow plane, at the level of the radiator 37.

As a function of the position of the mobile flap 21 planned at this level, the air flow 1 is either diverted across the radiator 37 or oriented directly towards the air outlet(s) 7.

Figure 6:
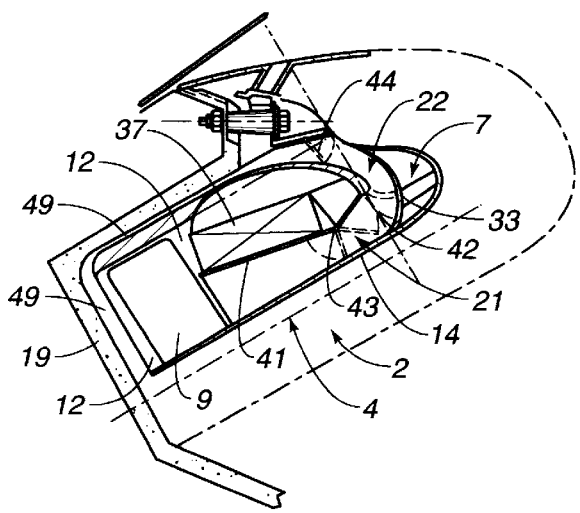

In this regard, as depicted in FIG. 6, the mobile flap 21 is made up, for example, of the two parts 41, 42, articulated in a synchronized manner around a same axle 43. If therefor it is desired to raise the temperature, the flap 21, at the level of the heating mechanisms 4, is positioned according to the dotted lines and the flow is slightly deflected in the depth of the body 12 in order to pass across the radiator 37. In the opposite case, the mobile flap 21 is positioned according to the solid lines and the air flow 1 then reaches the outlets 7 directly.

Figure 7:
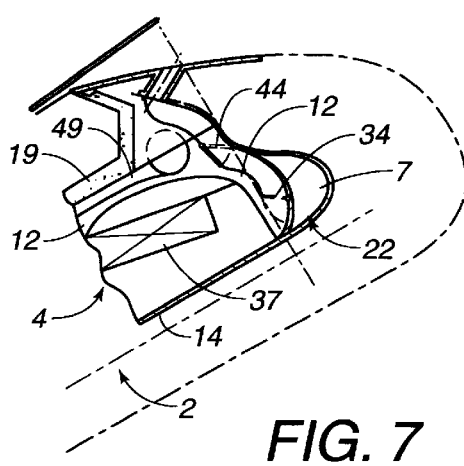

As depicted in FIGS. 6 to 7, when the mobile flap 22, positioned at the outlet, is positioned according to the solid lines, the air flow is directed toward the floor board and/or the windshield of the vehicle as a function of the position of a mobile flap 44 directed downstream along the path of the air flow 1. When the mobile flap 22 is arranged according to the dotted lines, the air flow 1 is then oriented toward the driver and/or the passengers of the vehicle.

If it is not desired to air condition the air flow 1, it is only necessary to cancel the effects of the evaporator 38 and/or remove it.

With reference to FIG. 2, it is observed that the first, second and third conduits 8, 9, 10 are oriented, for example, roughly in parallel to the longitudinal axis 11 of the three-dimensional component 2. Moreover, the three-dimensional component can be equipped with a flap 45 for changing the filter(s) 39 provided on the covering cap 14.

As depicted in FIGS. 1 and 8, the instrument panel according to the invention has, according to the embodiment depicted, additionally one or more covering panels 46 and/or one or more storage spaces 47, covering the three-dimensional component 2.

This covering 46 has, in particular, diffusers 48, fitted to allow the passage of the air flow 1 in the direction to the driver and/or passengers, the selection of the distribution of the air flow 1 between the different diffusers 48 is carried out, for example, upstream using the different sections 32, 33, 34 of the mobile flap 22 provided at the outlet.

According to the particular embodiment example depicted, the storage spaces 47 can be placed both in the upper part as well as in the lower part of the instrument panel.

Of course other items implemented by the invention presented here, understood by the expert, could have been imagined without necessarily going out of the frame of the present invention.

What is claimed is:

1. An instrument panel for a vehicle which allows for a circulation of an air flow in the vehicle, the instrument panel comprising:
   a three-dimensional component formed of only two parts said two parts consisting respectively of a body and a covering cap extending over said body, said body adapted to be positioned in the vehicle in a transverse direction to a longitudinal axis of the vehicle, said body having internal conduits therein, said body adapted to be positioned in the vehicle so as to resist lateral shocks imparted to the vehicle, said body having an air inlet and an air outlet in communication with said internal conduits;
   a ventilation mechanism connected to said internal conduits;
   a heating mechanism connected to said internal conduits; and
   an air conditioning mechanism connected to said internal conduits, said ventilation mechanism and said heating mechanism and said air conditioning mechanism and said air inlet and said air outlet being distributed in a common plane parallel to said transverse direction such that air circulates solely in said common plane from said air inlet to said air outlet.

2. The instrument panel according to claim 1, said body having receptacles formed thereon, said receptacles respectively receiving said ventilation mechanism and said heating mechanism and said air conditioning mechanism.

3. The instrument panel according to claim 2, said receptacles being covered by said covering cap.

4. The instrument panel of claim 1, further comprising:
   a running board; and
   said three-dimensional component fitted at a top section of said running board.

5. The instrument panel of claim 4, said three-dimensional component component having a section of an outline thereof facing said running board, said three-dimensional component positioned relative to said running board so as to define an air gap therebetween.

6. The instrument panel of claim 1, said covering cap having means formed thereon for receiving accessory components.

7. The instrument panel of claim 1, said three-dimensional component having means thereon for selecting a path of air flow through said internal conduits.

8. The instrument panel of claim 1, further comprising:
   at least one covering panel and at least one storage space covering a portion of said three-dimensional component.

9. An instrument panel apparatus which allows for a circulation of an air flow comprising:
   a vehicle having a running board;
   a three-dimensional component consisting of a body and a covering cap extending over said body, said body positioned in the vehicle in a transverse direction to a longitudinal axis of said vehicle, said body having internal conduits therein, said body positioned in said vehicle so as to resist lateral shocks imparted to said vehicle, said body having an air inlet and an air outlet in communication with said internal conduits, said three-dimensional component conforming to a shape of said running board and facing said running board, an air gap being formed between said three-dimensional component and said running board so as to define an air jet;
   a ventilation mechanism connected to said internal conduits;
   a heating mechanism connected to said internal conduits; and
   an air conditioning mechanism connected to said internal conduits, said ventilation mechanism and said heating mechanism and said air conditioning mechanism and said air inlet and said air outlet being distributed in a common plane parallel to said transverse direction.

* * * * *